US006952690B2

(12) United States Patent
Lumpp et al.

(10) Patent No.: US 6,952,690 B2
(45) Date of Patent: Oct. 4, 2005

(54) LOOP DETECTION IN RULE-BASED EXPERT SYSTEMS

(75) Inventors: Thomas Lumpp, Reutlingen (DE);
Juergen Schneider, Althengstett (DE);
Wolfgang Kuechlin, Hechingen (DE);
Carsten Sinz, Tuebingen (DE)

(73) Assignee: International Business Machines Corporation, Armonk, NY (US)

(*) Notice: Subject to any disclaimer, the term of this patent is extended or adjusted under 35 U.S.C. 154(b) by 334 days.

(21) Appl. No.: 10/227,026

(22) Filed: Aug. 22, 2002

(65) Prior Publication Data

US 2004/0039718 A1 Feb. 26, 2004

(51) Int. Cl.[7] .............................................. G06F 17/00
(52) U.S. Cl. ........................................................ 706/47
(58) Field of Search ........................................... 706/47

(56) References Cited

U.S. PATENT DOCUMENTS

| | | | |
|---|---|---|---|
| 5,228,116 A | 7/1993 | Harris et al. ................... 706/50 |
| 5,559,718 A | 9/1996 | Baisuck et al. ................ 716/5 |
| 5,592,590 A | 1/1997 | Jolly ............................ 706/47 |
| 5,596,752 A | 1/1997 | Knudsen et al. ............ 717/117 |
| 5,751,595 A | 5/1998 | Beatty, III et al. .............. 716/5 |
| 5,826,250 A | 10/1998 | Trefler ......................... 706/50 |
| 5,963,739 A | 10/1999 | Homeier ..................... 717/126 |
| 6,063,132 A | 5/2000 | DeCamp et al. ............... 716/5 |
| 6,078,737 A | 6/2000 | Suzuki ......................... 716/19 |
| 6,108,670 A | 8/2000 | Weida et al. ................ 707/203 |
| 6,175,946 B1 | 1/2001 | Ly et al. ......................... 716/4 |
| 6,182,020 B1 * | 1/2001 | Fairbanks ................... 702/117 |
| 2003/0217133 A1 * | 11/2003 | Ostrup et al. ............... 709/223 |

OTHER PUBLICATIONS

Park et al, "A Logic Based Expert System (LBES) for Fault Diagnosis of Power System", IEEE Transaction on Power System, Feb. 1997.*
Garone et al, "Capturing, Reusing, and Applying Knowledge for Competitive Advantage", An IDC White Paper Sponsored by Computer Associates, pp. 1–12.

(Continued)

Primary Examiner—George Davis
(74) Attorney, Agent, or Firm—Casimer K. Salys

(57) ABSTRACT

This invention describes a method to verify non-looping properties of programs implemented as rule-based expert systems. Our method detects conditions under which the expert system enters erroneous infinite program loops, which lead to non-terminating or oscillating computations, or otherwise proves the absence of such conditions. Our automatic procedure also gives advice on how to correct these errors. The expert systems considered consist of condition-action rules (IF-THEN-statements), where the conditions are logical expressions (formulas of a propositional finite domain logic), and the actions modify the value of a single variable which in turn can be part of other logical expressions. There may be additional (external) variables not controlled by the expert system, and each rule may have an associated evaluation priority.

17 Claims, 6 Drawing Sheets

OTHER PUBLICATIONS

J. Horl et al "Formal Specification of a Voice Communication System Used in Air Traffic Control", An industrial application of light–weight formal methods using VDM++, FM'99, vol. II, vol. 1709 of Lecture Notes in Computer Science, pp. 1868, 1999.

D. Harel, "Dynamic Logic", Gabbay & Guenthner, editors, Handbook of Philosophical Logic, vol. II: Extensions of Classical Logic, pp. 507–544, Kluwer, 1984.

D. Harel et al, "Looping vs. Repeating in Dynamic Logic", Information and Control, 55(1–3): pp. 175–192, 1982.

A. Kaiser, "A SAT–Based Propositional Prover for Consistency Checking of Automotive Product Data", Technical Report, Wilhelm–Schickard–Institut fur Informatik, Eberhard–Karls–Universitat Tubingen, Sand 13, 72076 Tubingen, Germany, 2001. Technical Report WSI–2001–16.

Kautz et al, "Encoding Plans in Propositional Logic", In Proc. Fifth International Conference on Principles of Knowledge Representation and Reasoning (KR '96), pp. 374–384, Cambridge, MA, Nov. 1996.

Spreeuwenberg et al, "VALENS: A Knowledge Based Tool to Validate and Verify An Aion Knowledge Base", In ECAI 2000, 14th European Conf. On Artificial Intelligence, pp. 731–735, IOS Press, 2000.

F. Somenzi, CUDD: CU Decision Diagram Package, Rel. 2.3.0, University of Colorado, Boulder, 1998.

R. Streett, "Propositional Dnamic Logic of Looping and Converse is Elementarily Decidable", Information and Control, 54(1/2): pp. 121–141, 1982.

Grumberg et al, "A Proof Rule for Fair Termination of Guarded Commands", Information and Control 66(1/2):pp. 83–102, 1985.

Gamble et al, "Applying Formal Verification Methods to Rule–Based Programs", International Journal of Expert Systems: Research and Applications 7(3), pp. 203–237, 1994.

Preece et al, "Validating Dynamic Properties of Rule–Based Systems", International Journal of Human ComputerStudies, 44(2): pp. 145–169, 1996.

Laffey et al, "Knowledge Base Verification", AL Magazine, AAAI Press, Summer 1987, PP. 69–75.

\* cited by examiner correlation set/status/compound/satisfactory:

when     status/compound NOT E {Satisfactory}

AND status/startable E {Yes}

AND ( ( status/observed E {Available, Was Available}

AND status/desired E {Available}

AND status/automation E {Idle, Internal}

AND correlation/external/stop/failed E {false}

)

OR ( status/observed E {SoftDown, StandBy}

AND status/desired E {Unavailable}

AND status/automation E {Idle, Internal}

)

)

then SetVariable status/compound = Satisfactory

RecordVariableHistory status/compound

FIG. 6

LOOP DETECTION IN RULE-BASED EXPERT SYSTEMS

BACKGROUND OF THE INVENTION

1. Field of the Invention

The present invention generally relates to a method and device for automatically testing the correctness of a control system. Particularly, the present invention relates to a method and device for verifying a set of rules in a rule-based expert system.

2. Description of the Related Art

The use of knowledge bases as components within safety or business critical systems has become more and more widespread during the 90s, and has attracted renewed attention in agent based intelligent web-applications. A very common technique to store knowledge in these systems is via rules. This form of expressing knowledge has—amongst others—the advantage that it employs a representation that resembles the way experts tend to express most of their problem solving techniques, namely by situation-action rules.

Most of today's expert systems are rule-based. They consist of a set of condition-action rules, which—taken together—define the overall behavior of the system. Each single rule describes a situation in which a certain action has to take place. For example, in an expert system for E-mail processing, a rule may say that whenever a message for user A is received with a subject containing the word W, it is forwarded to mailbox M on system S.

Small expert systems consisting of just a few dozen of rules and maintained by only one person may well be fully understood without too much effort. But as the number of rules increases, the complexity of the whole system increases disproportionately. Multiple persons working together on the same rule base aggravate this effect. This weighs even more as it is often impossible to partition the rule set into mutually independent groups of rules. The resulting dependencies may lead to unintended behavior, for example, by simultaneously activating two rules with contradictory actions. In such situations, the expert system may enter a loop characterized by oscillation between two or more computation states, which ultimately results in a non-terminating computation.

Thus, in such a case, the expert system gets hung up and does not produce any further answers. Clearly, this has to be avoided, especially when the expert system is used as a component within a safety or business critical computer system.

Due to the high complexity there is a strong potential for errors during the generation and maintenance of rules. In this patent we present a solution to a very common problem of expert systems: the existence of overlapping rules or inconsistently interacting rules, which lead to program cycles or loops. With increasing size of the rule base the detection and avoidance of such faults becomes dramatically harder, and thus has to be handled systematically.

In U.S. Pat. No. 6,063,132 by William Frantz DeCamp et. al., assigned to International Business Machines Corporation, Armonk, N.Y., US, filed Jun. 26, 1998, issued May 16, 2000, "Method for verifying design rule checking software", design rules for VLSIchip design are verified by repeatedly running predefined checks on these rules. This is only applicable to IC (integrated circuit) design rules, there is no check for consistency of rule systems mentioned.

U.S. Pat. No. 5,559,718 by Allen Baisuck et. al., assigned to Cadence Design Systems, Inc., San Jose, Calif., US, filed Apr. 28, 1994, issued Sep. 24, 1996, "System and method for model-based verification of local design rules", shows a method to verify properties of ICs composed of different cells, each described by rules of a design model. It checks dependencies between cells, and the cells itself. However, the method is not applicable to rule-based expert systems.

U.S. Pat. No. 6,078,737 by Kyou Suzuki, assigned to NEC Corporation, Tokyo, Japan, filed Sep. 18, 1997, issued Jun. 20, 2000, "Design rule check method", relates to detection of violation of design rules in IC design, including overlapping rule violations. However, the subject matter is applicable to IC design only, not to general expert system rule bases.

U.S. Pat. No. 5,592,590 by Christopher H. Jolly, assigned to General Electric Company, Schenectady, N.Y., US, filed Jul. 1, 1994, Jan. 7, 1997, "Method for efficiently detecting covered rules in a knowledge base", teaches a way of detecting of useless rules in a knowledge base. However, no detection of infinite computations is taught, hence, it refers to a different class of errors.

U.S. Pat. No. 5,751,595 by Harry John Beatty et. al., assigned to International Business Machines Corporation, Armonk, N.Y., US, filed Mar. 14, 1996, issued May 12, 1998, "Method for building and verifying authenticity of a rule system", shows a method to check for unauthorized modification of rule base. However, a detection of errors within rule base is not disclosed.

U.S. Pat. No. 6,108,670 by Robert Anthony Weida et. al., assigned to International Business Machines Corporation, Armonk, N.Y., US, filed Dec. 30, 1998, issued Aug. 22, 2000, "Checking and enabling database updates with a dynamic, multi-modal, rule based system", describes an update mechanism for databases employing rules. However, no error checking of dynamic aspect of rule system is taught.

U.S. Pat. No. 5,963,739 by Peter Vincent Homeier, Philadelphia, Pa., filed Apr. 25, 1997, issued Oct. 5, 1999, "Method for verifying the total correctness of a program with mutually recursive procedures", discloses a verification method for procedural programs by building verification conditions based on procedure call graph. However, the discloses method is not applicable to rule bases.

In U.S. Pat. No. 6,175,946 by Tai An Ly et. al., assigned to O-IN Design Automation, San Jose, Calif., US, filed Oct. 20, 1997, issued Jan. 16, 2001, "Method for automatically generating checkers for finding functional defects in a description of a circuit", descriptions of IC functionality ("checkers") are automatically generated in order to find errors. This is not applicable to rule bases.

U.S. Pat. No. 5,596,752 by Helge Knudsen et. al., assigned to Amdahl Corporation, Sunnyvale, Calif., US, filed Mar. 11, 1993, issued Jan. 21, 1997, "System for creating, editing, displaying, and executing rules-based programming language rules having action part subsets for both true and false evaluation of the conditional part", relates to maintenance of rule systems. However, there is no method for error detection within rule system described.

U.S. Pat. No. 5,228,116 by Larry R. Harris, assigned to Aicorp., Inc., Waltham, Mass., US, filed May 17, 1991, issued Jul. 13, 1993, "Knowledge base management system" relates to checking of if-conditions in (COBOL-)programs using an expert system, with rules stored in external data base. However, there is no error detection within rule base.

U.S. Pat. No. 5,826,250 by Alan Trefler, assigned to Pegasystems Inc., Cambridge, Mass., US, filed Jun. 19, 1996, issued Oct. 20, 1998, "Rules bases and methods of access thereof", relates to a special kind of expert system allowing inheritance of facts. There is no error detection involved.

Grumberg, O., Francez, N., and Makowsky, J. A., "A Proof Rule for Fair Termination of Guarded Commands", Information and Control 66(1/2):83–102, 1985. This paper describes a highly abstract method to detect non-termination of rule-based programs. The method relies on the generation of a well-founded partial ordering (W, Table 1), but there is no algorithm given for its computation.

Gamble, R. F., Roman, G.-C., Ball, W. E., and Cunningham, H. C., "Applying Formal Verification Methods to Rule-based Programs," International Journal of Expert Systems: Research and Applications 7(3):203–237, 1994.

Preece, A. D., Grossner, C., and Radhakrishnan, T., "Validating Dynamic Properties of Rule-Based Systems", International Journal of Human Computer Studies, 44(2) :145–169, 1996. Here, a method to check dynamic properties of rule-based systems is presented. It generates an execution graph and examines paths in this graph that correspond to possible program runs. However, only a fraction of possible runs can be covered in reasonable time. Therefore the method cannot, e.g., guarantee the absence of loops.

Thomas J. Laffey, Walton A. Perkins, Deanne Pecora and Tin A. Nguyen, "Knowledge Base Verification" A1 Magazine, AAAI Press, Summer 1987, 69–75.

The examples above showed that a correct definition and the maintenance of rule-based expert systems are hard and error-prone. Considering all possible cases one by one is prohibitive as, for example, a rule set with only 25 (binary) variables generates over 33 million theoretically possible combinations. Therefore, a systematic and automatic methodology has to be applied.

Further related references cited in the System Automation (SA) example hereinafter are as follows:

[GBOO] S. Garone and N. Buck. *Capturing, Reusing, and Applying Knowledge for Competitive Advantage: Computer Associate's Aion.* International Data Corporation, 2000. IDC White Paper.

[HA99] J. Horl and B. K. Aichernig. Formal specification of a voice communication system used in air traffic control: An industrial application of light-weight formal methods using VDM$^{++}$. In *FM'99-Formal Methods, Vol. II,* volume 1709 of *Lecture Notes in Computer Science,* pages 1868–1868. Springer, 1999.

[Har84] D. Harel. Dynamic logic. In D. Gabbay and F. Guenthner editors, *Handbook of Philosophical Logic,* volume II: Extensions of Classical Logic, pages 507–544. Kluwer, 1984.

[HS82] D. Harel and R. Sherman R. Sherman. Looping vs. Repeating in dynamic logic. Information and Control, 55(1–3):175–192, 1982.

[KaiOl] A. Kaiser. A SAT-based prepositional prover for consistency checking of automotive product data. Technical report, Wilhelm-Schickard-Institut fur Informatik, Eberhard-Karls-Universitat Tubingen, Sand 13, 72076 Tubingen, Germany, 2001. Technical Report WSI-2001-16.

[KMS96] H. Kautz. D. McAllester, and B. Selman. Encoding plans in prepositional logic. In *Proc. Fifth International Conference on Principles of Knowledge Representation and Reasoning (KR'96),* pages 374–384, Cambridge, Mass., November 1996, Morgan Kaufmann.

[SGBOO] S. Spreeuwenberg/, R. Gerrits, and M. Boekenoogen. VALENS: A Knowledge Based Tool to Validate and Verify an Aion Knowledge Base. In *ECAI* 2000, 14*th European Conference on Artificial Intelligence,* pages 731–735. IDS Press, 2000.

[Som98] F. Somenzl. *CUDD: CU Decision Diagram Package, Release* 2.3.0. University of Colorado, Boulder, 1998. Available at http://vlsi.colorado.edu/fabio.

[Str82] R. S. Streett. Propositional dynamic logic of looping and converse is elementarily decidable, *Information and Control,* 54(1/2): 121–141, 1982.

OBJECT OF THE INVENTION

Starting from this, the object of the present invention is to provide a method and a device for automatically verifying a set of rules in a rule-based expert system.

BRIEF SUMMARY OF THE INVENTION

The foregoing object is achieved by a method and a system as laid out in the independent claims. Further advantageous embodiments of the present invention are described in the sub claims and are taught in the following description.

According to the present invention a method and a device is provided for verifying a set of rules in a rule-based expert system. First, a set of rules is retrieved from an expert system and one or more logical expressions are provided specifying cases of faulty behavior of said expert system. Then, an automatic theorem prover is executed in order to verify of whether or not the retrieved set of rules fulfill the provided one or more logical expressions. Subsequently, if yes, a message is generated indicating the existence of a case of faulty behavior and, if no, a message is generated indicating the correctness of said set of rules.

In one embodiment the present invention may be used to verify non-looping properties of programs implemented as rule-based expert systems. The method and device according to the present invention detects conditions under which the expert system enters erroneous infinite program loops, which lead to non-terminating or oscillating computations, or otherwise proves the absence of such conditions. The automatic procedure taught by the present invention may also give advice on how to correct these errors.

The present invention may be used with a wide variety of expert systems. However, preferably, the expert system to be verified according to the subject matter of the present invention consists of condition-action rules (IF-THEN-statements), whereby the conditions are logical expressions (formulas of a propositional finite domain logic), and the actions modify the value of a single variable which in turn can be part of other logical expressions. There may be additional (external) variables not controlled by the expert system, and each rule may have an associated evaluation priority.

Two short examples are meant to visualize the difficulties occurring when using rule-based expert systems. Both of them describe parts of a simplified room (climate) controller that, e.g., drives roller blinds up and down, or opens and closes windows based on certain environmental conditions.

In the first example a window is opened and closed, depending on room temperature and weather condition (cf. Rule Set 1). The expert system consists of two rules, which define that the window is opened when the temperature is higher than 30° C., and closed when it is raining. It is obvious that this rule set does not define a correct behavior when at the same time the temperature is over 30° C. and it is raining. Both actions of opening and closing the window are constantly activated and lead to a looping program behavior.

Rule Set 1:
IF (temp>30)
THEN window=open
IF (raining=true)
THEN window=closed

An error in such a simple arrangement such as the exemplification above may easily be detected. However, the subject matter of the present invention provides a way to automatically identifies the case temp>30, raining=true, and moreover shows that this is the only case in which a loop can occur.

With the next example, in which "|" denotes logical OR, and "&" denotes logical AND, (cf. Rule Set 2) it becomes apparent that a growing number of rules increases the need for an method and device for verifying a set of rules in a rule-based expert system.

Rule Set 2.
IF (temp>30 & airCondition=off & (raining= false|sunshine=true) & rollerBlind=up & fireAlarm= false)
THEN window=open
IF (temp<=30|aircondition=on|raining=true|fireAlarm= true)
THEN window=closed In this case, it is not clear at first glance whether or not a problematic case exists. However, there is one for temp>30, airCondition=off, raining=true, sunshine=true, rollerBlind=up and fireAlarm=false. In this case an erroneous loop behavior occurs.

With these simple examples it should become apparent that for a complex rule base consisting of dozens or hundreds of rules an automatic error detection is needed. In addition to this, rule sets occurring in practice typically contain rules where output variables of the THEN-statement are also used as input variables of the IF-statement. For instance, it is assume that the sun never shines when it is raining. Therefore, the additional rule IF (raining=true)
THEN sunshine=false is included to Rule Set 2. Advantageously in the above example the loop vanishes. However, the variable 'sunshine' is now used both as input and output variable leading to interdependent rules, which may cause inconsistent behavior.

In a preferred embodiment of the present invention the set of rules is converted from the expert system's format into logical expressions. Additionally, multi-valued logic variables my be converted into two-valued logic variables.

As mentioned above the set of rules may be basically formed by a series of IF-THEN-statements and the action part of the IF-THEN-statement may be transformed into a logical expression. In addition said one or more logical expressions specifying cases of faulty behavior may be derived from one or more abstract definitions of erroneous scenarios, such as logical expressions specifying rule-overlaps and/or inconsistently interacting rules and/or providing a logical expression specifying overlapping IF-statements of rules with the same variable in the THEN-statement and/or providing a logical expression specifying inconsistently interacting rules in the sense that the THEN-statement of one rule activates the IF-statement of another rule and vice versa.

Preferably, deriving said one or more logical expressions specifying cases of faulty behavior from one or more abstract definitions of erroneous scenarios includes taking into account the set of rules retrieved from the expert system.

Advantageously, the result provided by said automatic theorem prover gets simplified, for example, by removing irrelevant variables.

It is acknowledged that the concept of the present invention may also be implemented in a device for verifying a set of rules in a rule-based expert system or even a computer system containing a rule-based expert system and such a device. Advantageously, it could be ensured that changes applied to the set of rules are automatically verified in order to ensure a correct behavior.

Hence, the method and device according to the present invention allows the detection of errors in the expert system's rule base, such as errors that provoke infinite program loops. Since in the present setting all non-terminating computations of the expert system arise as infinite program loops, the method of the present invention advantageously covers all possible kinds of non-termination. Compared with other quality assurance procedures like testing, this method has the major advantage to encompass all possibly emerging situations, not only those covered by the generated test patterns. In case the method indicates the absence of loops, this statement has the quality of a rigorous mathematical proof, whereas testing can only guarantee this property for the—often small—fraction of explicitly considered cases.

Furthermore, providing help for correcting the reported errors is a significant part of the applied methodology. The automatic simplification of error conditions makes the error cases easier to understand for persons maintaining the expert system's rule base.

Thus, major advantages of the subject matter of the present invention are the following: It covers a broad class of errors that occur in the design and maintenance of rule-based expert systems (loops, non-termination). It detects loops without misses, i.e., a complete coverage of all cases is guaranteed and correcting of errors gets simplified due to the automatic analysis.

BRIEF DESCRIPTION OF THE SEVERAL VIEWS OF THE DRAWINGS

The above, as well as additional objectives, features and advantages of the present invention, will be apparent in the following detailed written description.

The novel features of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 6 shows an example of a correlation rule.

DETAILED DESCRIPTION OF THE INVENTION

Figure 1:
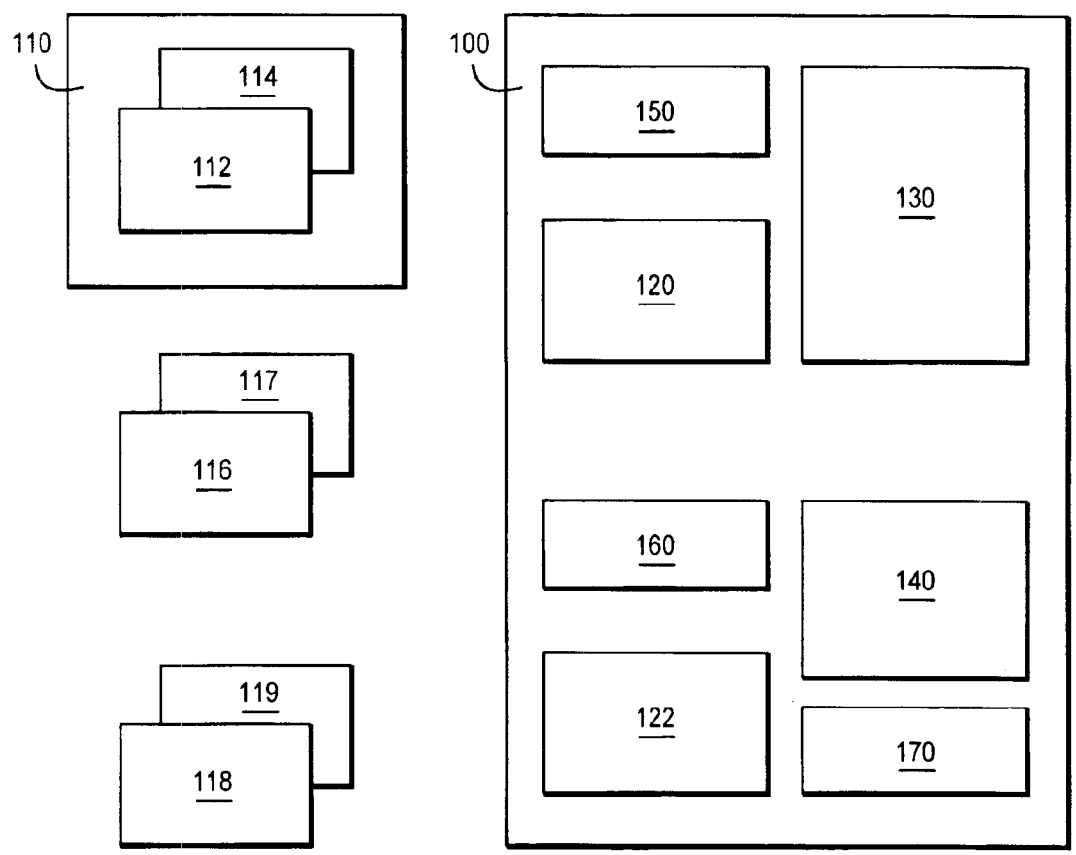
FIG. 1 shows a high-level block diagram illustrating a device in accordance with the present invention together with an external expert system and data input.

With reference now to FIG. 1, there is depicted a a high level block diagram illustrating a device 100 in accordance with the present invention together with an external expert system 110 and data input.

The expert system 110 based on one or more set of rules 112, 114, whereby one set of rule may also consist of all rules provided by the expert system 110. It may be implemented as a computer program or as part of an apparatus for controlling electrical devices such as a climate control system or a complex computer system comprising database, storage, execution units and networks. One or more logical expressions 116, 117 and one or more descriptions of erroneous scenarios 118, 119 are provided. The logical expressions 116, 117 and the erroneous scenarios 118, 119 may be formed by a text file that may follow a predetermined standard, such as an XML (Extensible Markup Language) based format.

The device 100 may also be implemented in hardware or software and is configured to verify the set of rules 112, 114 in the rule-based expert system 110. It further comprises means 120 for retrieving the set of rules 112, 114 from the expert system 110, means 122 for providing one or more logical expressions 116, 117 specifying cases of faulty behavior of said expert system, an automatic theorem prover 130 for verifying of whether or not the retrieved set of rules fulfill the provided one or more logical expressions and means 140 for generating a message, whereby said means for generating a message is configured to generate a message indicating the existence of a case of faulty behavior and a message indicating the correctness of said set of rules depending on a result generated by said automatic theorem prover 130.

In a preferred embodiment the device 100 further comprises means 150 for converting the set of rules 112, 114 from the expert system's format into logical expressions.

Preferably, the device is further equipped with means 160 for deriving said one or more logical expressions 116, 117 specifying cases of faulty behavior from one or more abstract definitions of erroneous scenarios 118, 119.

In a further preferred embodiment the device further comprises means 170 for simplifying the result provided by said automatic theorem prover 130.

In principal a single rule of the set of rules 112, 114 consists of two parts, where the IF-statement is typically a logical expression. Today, there is an established mathematical theory for the computation and evaluation of such logical formulas.

A lot of different languages and logic have been developed to reason, e.g. about universally valid facts (propositional logic), about properties of computer hardware (computational tree logic) or about simple abstract computer programs (dynamic logic). Moreover, for many logic algorithms and computer programs (so-called automatic theorem provers, ATPs) have been developed to automatically find out whether or not a given formula is true. Mathematicians themselves use these automatic theorem provers in order to prove results in their field mainly, but in principle all concrete systems that can be described by purely logical means can be handled by these ATP programs.

According to the subject matter of the present invention an automatic theorem prover (also in the form of a model checker, a satisfyability checker or as binary decision diagrams) is employed for fast, automatic and systematic loop error detection in rule-based expert systems.

Figure 2:
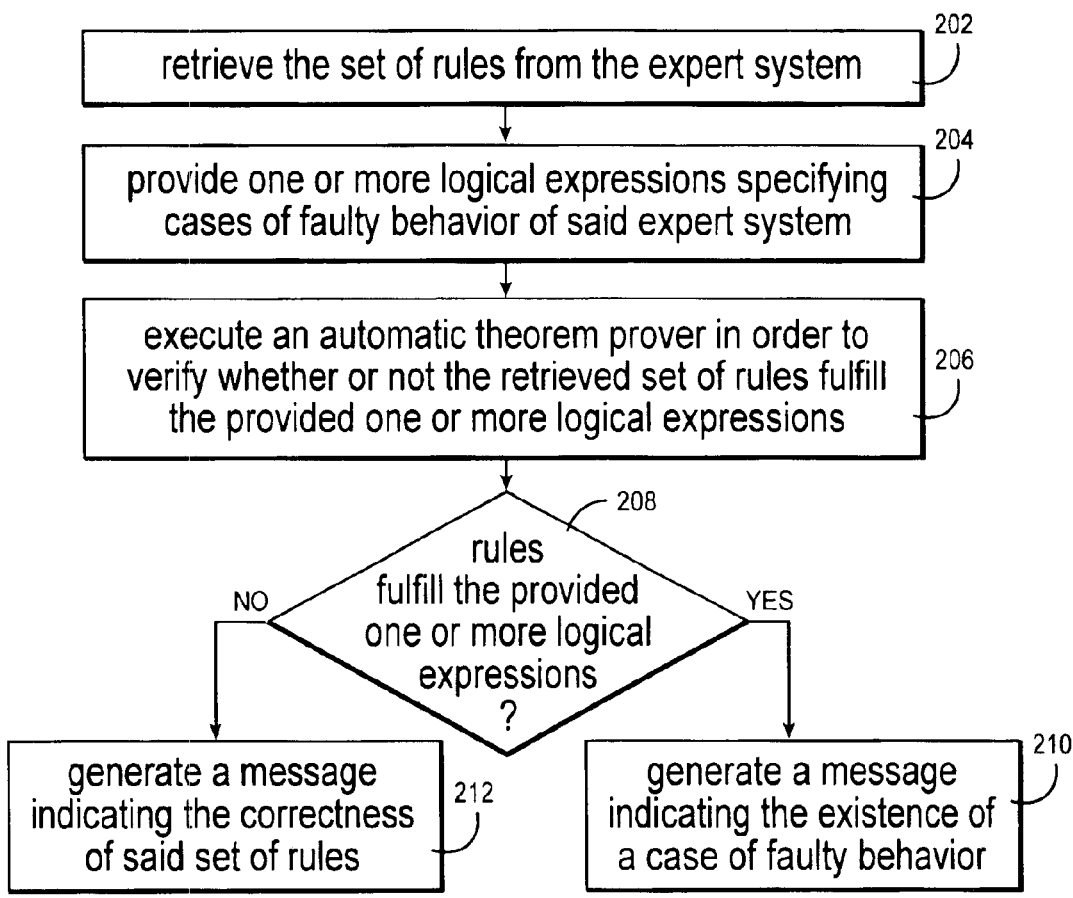
FIG. 2 shows a high level flow chart illustrating a method for verifying a set of rules in a rule-based expert system in accordance with the present invention.

With reference to FIG. 2, there is depicted a high level flow chart illustrating a method for verifying a set of rules in a rule-based expert system in accordance with the present invention. The method of the present invention consists of the following major steps:

First, a set of rules is retrieved from an expert system (block 202) and one or more logical expressions are provided specifying cases of faulty behavior of said expert system (block 204). It is acknowledged that the order of the steps depicted in blocks 202 and 204 does not matter. It could also be opposite or both actions may occur concurrently. Then, an automatic theorem prover is executed (block 206). Followed by a decision step in which it is verified of whether or not the retrieved set of rules fulfill the provided one or more logical expressions (block 208). If yes, a message is generated indicating the existence of a case of faulty behavior (block 210) and, if no, a message is generated indicating the correctness of said set of rules (block 212).

Figure 3:
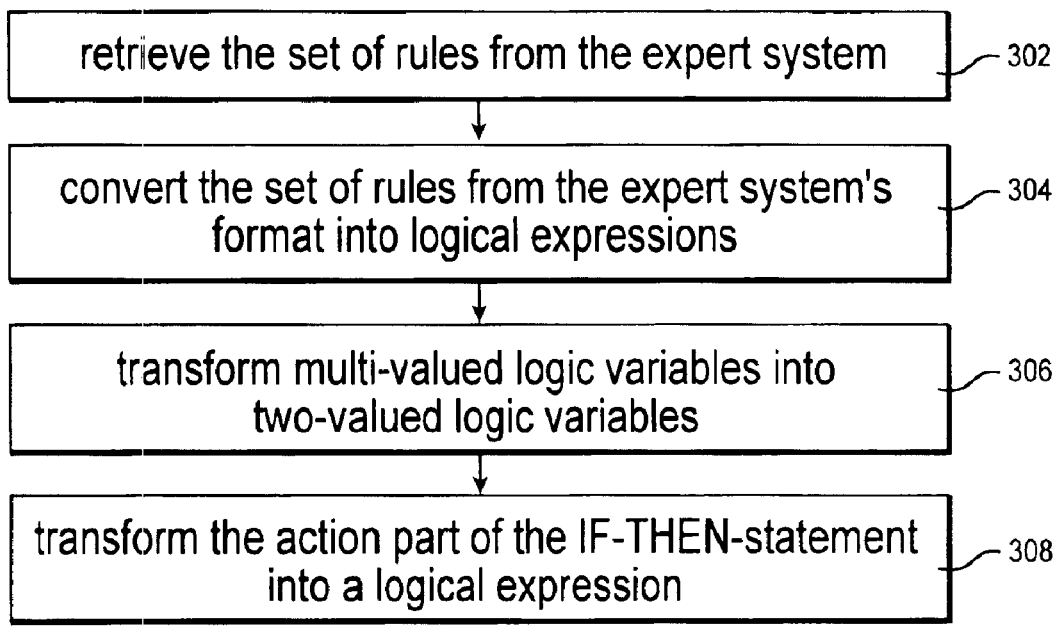
FIG. 3 shows a detailed flow chart illustrating a preferred embodiment of a first portion of the method as shown in FIG. 2.

Now with reference to FIG. 3, there is depicted a detailed flow chart illustrating a preferred embodiment of a first portion of the method as shown in FIG. 2, namely of the retrieving step as illustrated in block 202 of FIG. 2.

Rules are retrieved from or somehow provided by an expert system (block 302). This may include an automatic language conversion (block 304) from the expert system's language into the prover's logic language (e.g. propositional logic).

The language used to define rules in the expert system may differ with respect to syntax and semantics considerably from pure logical languages, which are used as input for the automatic theorem prover. Therefore as a first step a language conversion may be employed that translates all the rules of the expert system into the logic's language, and considers the rule execution and evaluation schema of the expert system (block 304). Of course, a prover could also be implemented that uses the expert system's language directly.

Part of this conversion may be an adaptation of variables, e.g. from multi-valued variables (like variables with enumeration types in Pascal, C++, Java) to binary-valued (Boolean) variables (block 306). The conversion may also proceed by an additional step, which converts the expert system language into an intermediate language, e.g. propositional dynamic logic, by transforming the action part of the IF-THEN-statement into a logical expression (block 308). This step generates as output the logical content of the rule base and the expert system program.

Figure 4:
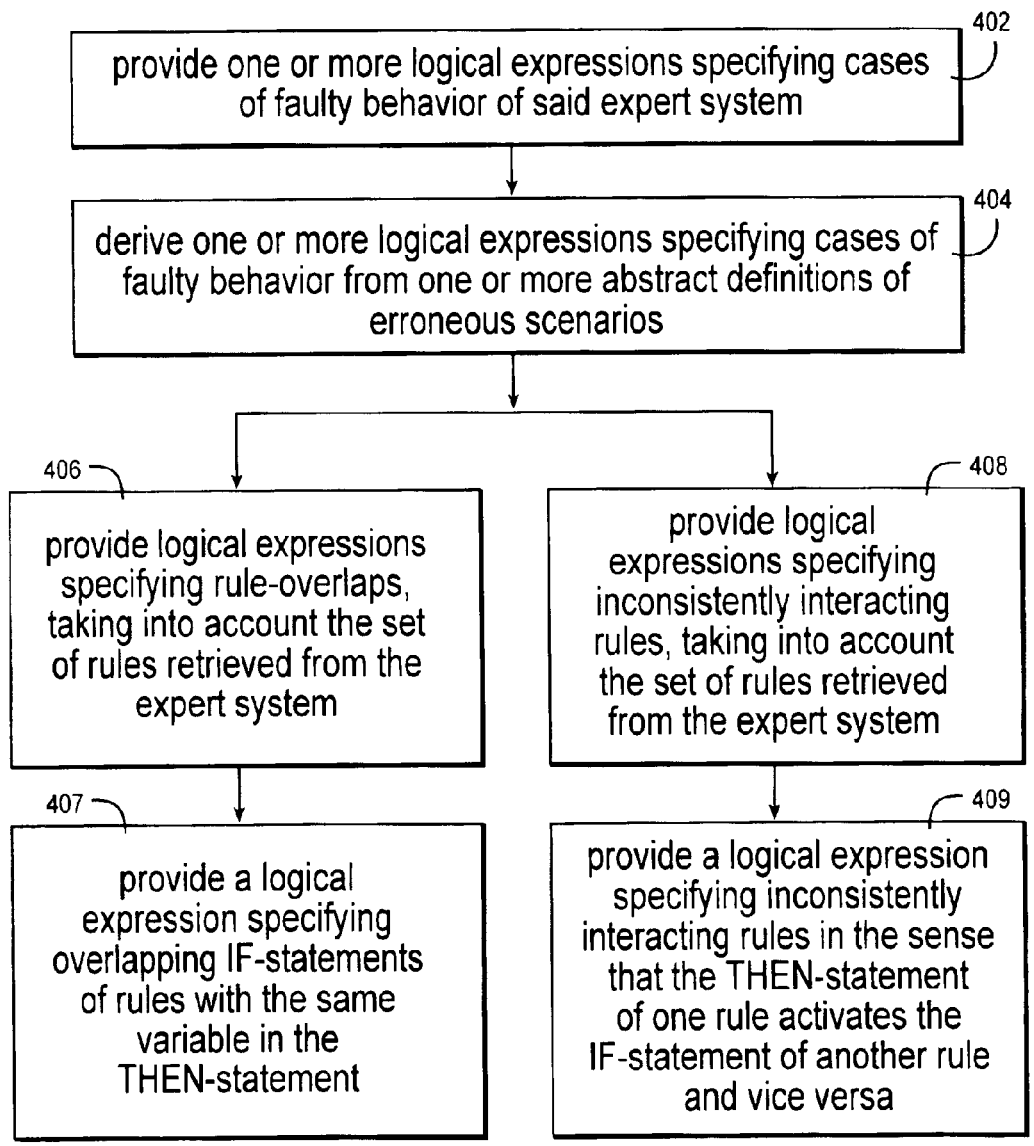
FIG. 4 shows a detailed flow chart illustrating a preferred embodiment of a second portion of the method as shown in FIG. 2.

With reference now to FIG. 4, there is depicted a detailed flow chart illustrating a preferred embodiment of a second portion of the method as shown in FIG. 2, namely the step of providing one or more logical expressions specifying cases of faulty behavior of said expert system as shown in block 204 of FIG. 2.

The logical expressions are provided or otherwise gathered that specify faulty behavior (block 402). This may include automatic looping property generation.

Before a rule set can be validated, additional logical expressions are generated which can be used to examine specific loop check conditions (LCCs) of the rule set (block 404). An LCC is a logical expression that checks for a scenario in which the expert system's program could loop.

An LCC is true in all those situations where a loop occurs. It consists of all rules or a subset of the rules of the expert system and additional logical expressions describing a particular test scenario. Depending on the problem description there may be only one or a whole set of LCCs, and all LCCs taken together cover all possible scenarios. Of course, these LCCs have to be generated automatically, which is done in the looping property generation step.

Depending on the implementation of the expert system there might be different possible situations in which interactions between rules can cause unintended loops. One example for this is overlapping IF-statements of rules with the same variable in the THEN-statement (block 407), as is the case in Rule Set 1 above. Here both conditions (temp>30, raining=true) can occur at the same time causing the loop error by overlap. Another example is to determine inconsistently interacting rules (block 408).

Inconsistently interacting rules may be detected by looking for one variable in the sense that the THEN-statement of one rule activates the IF-statement of another rule and vice versa. Yet another example is to check for loops involving rules containing two or more different variables in their THEN-statements (block 409).

As already mentioned, there are a lot of other different situations to check for, which are all covered by this method as long as LCCs can be generated for the situation. Especially, the opposite of rule overlaps, namely the case that no rule at all is activated for one variable, can also be modeled by LCCs.

With growing size of the rule set of the expert system the LCC generation should be performed automatically. It is even possible to have a specialized language for the description of loop error situations. This language would allow the abstract definition of possible loop error scenarios, which are taken as base for the generation of the LCCs from the expert system rule set.

As already explained with reference to FIG. 2, subsequently, an automatic theorem prover is executed.

In this step the LCCs are provided as input for the automatic theorem prover, and are sequentially checked. Algorithms providing suitable automatic theorem proving capabilities include, among others, the Davis-Putnam procedure, binary decision diagrams (BDDs), resolution, and model checking.

Figure 5:
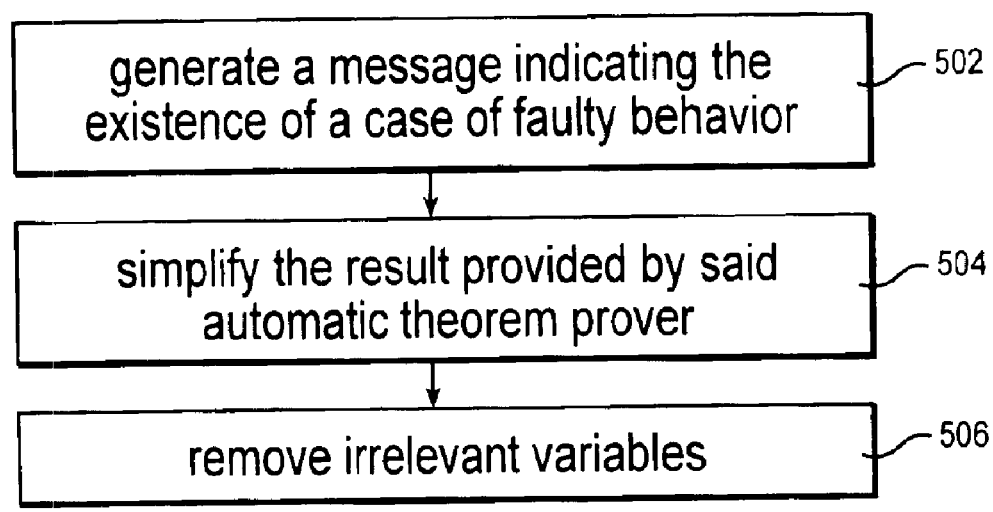
FIG. 5 shows a detailed flow chart illustrating a preferred embodiment of a third portion of the method as shown in FIG. 2.

Finally, with reference to FIG. 5, there is depicted a detailed flow chart illustrating a preferred embodiment of a third portion of the method as shown in FIG. 2, namely of block 210.

The prover generates for each LCC the information whether a loop can occur for the situations described by the LCC (block 502). This output may vary in the amount of information that is given to the user. One possibility is that it merely gives a yes/no-answer. Another possibility could be an explicit list of possible variable combinations under which the loop occurs, or even a logical formula describing this list.

Advantageously, the results may be simplified (block 504).

In many cases the information given by the automatic theorem prover may be simplified using existing standard techniques from mathematical logic. For example, a list of variable combinations may be extensively long and can be dramatically simplified by removing irrelevant variables (block 506). Irrelevant variables can be those that are not contained in the rules under investigation. Another example is logical simplifications of formulas describing a looping scenario (e.g. by BDD-based abstraction or similar techniques).

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

System Automation (SA) Example

The basic idea behind SA is to fully automate a computer center and to increase the availability and reliability of business applications. It allows to define complex software environments in which applications are automatically started, stopped, and supervised during runtime. In the case of an application or system failure, SA can react immediately and solve the problem by restarting the application or, if this is not possible any more, restart it on another system in the cluster. SA provides functionality like grouping which allows to automate a collection of applications as one logical unit. Furthermore, dependency management allows the definition of start and stop relationships, for example start A before B.

For a better understanding of SA, let us consider a simplified flight reservation system that can be used by hundreds of users in parallel. Such an application consists of various functional components: a database that stores information about flight schedules, reservations, and billing; a transaction management system which guarantees overall data consistency; a network infrastructure with different protocol stacks and firewalls; a web server environment for the user interface; and possibly further system dependent components. To model this application in SA, we define a top level group "flight reservation" which has each of the functional components as a member. Since the functional components themselves consist of various applications these are also each defined as groups.

Besides, most of the applications have start and stop dependencies to other applications. In our example, parts of the transaction management system may depend on the underlying database to work properly. With SA, one can define that a start of the transaction management is only performed when the required database is running (start dependency). Therefore SA would start the database first in order to start the transaction management system. Starting the database, however, may in turn depend on system specific applications having been started before. Similar relations can hold when stopping applications (stop dependency). For example, it should not occur that the database is stopped before the transaction system is brought down. So moving an application with complicated start and stop dependencies from one system to another (for example in case of a malfunction) can be quite an elaborate task. Moreover, applications that can or should not work simultaneously on the same system can generate conflicting requirements.

Outline of SA Software Architecture

The SA software consists of two logical parts: a manager and an agent. There is only one active manager, but additional backup managers can be defined. Agents are located on each system in the cluster. The manager acts as a Sysplex-wide decision maker. It determines for all applications when they have to be started or stopped, and observes their activity. When making its decisions the manager takes grouping and dependency restrictions into account.

The manager does not perform application starts and stops by itself. Instead, it sends a start or stop command to the agent on the system where the application is located. This agent receives the order and does the actual start- or stop-processing. Furthermore the agent informs the manager about the current status of all applications on the system where it is running. Thus the manager possesses information about the complete status of the cluster. The manager does its internal processing based on abstract (proxy) resources. The implementation of the manager is done in a generic way: Most parts of the manager are implemented as a rule-based expert system. For example, the start and stop dependency behavior is defined by a collection of specific rules in the expert system. In the rest of this paper we will focus on this rule-based expert system.

The Automation Manager's Rule-Based Expert System

The Automation Manager is implemented as a rule-based expert system. Its core consists of an automation engine which besides rule execution can interpret a few hundred different instructions which are used to create and manipulate abstract resources within the manager. For each definition of an automation entity (application, group, etc.) an abstract resource is generated by the manager. Groups of rules are then associated with each resource. These rules, called correlation rules, are taken from a basic rule set of a couple hundred of rules contained in SA, and their variables are instantiated for their resource. All correlation rules are of the form correlation <name>:
    when <formula>
    then <action list> where formula is a finite domain formula with atomic propositions of the form

<var> E {<val$_1$>, . . . ,<val$_n$>}
    <var> NOT E {<val$_1$>, . . . ,<val$_n$>} and the usual Boolean connectives AND, OR and NOT. Variable names may contain alpha-numerical characters and the slash. E denotes set membership. The only actions in the then-part we are interested in are assignment statements of the form SetVariable <var>=<val$_i$>. Other actions in the SA system are mainly used for event logging and to present messages to the user. Only one SetVariable-action is present in each rule's action list.

To compute, for example, the compound state of a resource, rules are evaluated according to the following scheme: As soon as a variable changes its value, the automation manager re-evaluates the rules to reflect this change: the rules are tested one by one, whether the formula of the rule's when-part evaluates to true under the current variable assignment. If this is the case, the action part is executed, which may result in further variable changes. The whole process stops when no more variable changes occur. The order in which rules are evaluated is not specified—with the exception of a fairness condition stating that no rules are missed out.

Changes on the variables' values may occur for two reasons: (i) by a "spontaneous" change of volatile (transient, observed) external variables not controlled by the correlation rule system or (ii) by execution of SetVariable-actions in the then-part of a rule. We therefore partition the set V of variables contained in the correlation rules into two disjoint sets: a set of computed state variables $V_S$ and a set of observed external variables $V_O$, such that $V=V_S \uplus V_O$. $V_S$ comprises exactly those variables that occur in a rule's action part, i.e. variables that may be changed by rule execution. The values of externally controlled, observed variables are delivered to the rule system either by the resource's automation agent or by the central Automation Manager itself.

Formalization of Correlation Rules and Consistency Properties

For a formalization of the correlation rules and the computation done by the Automation Manager, we have selected PDL. There are many reasons for our choice. First, correlation rules can easily be translated to PDL, and the resulting formulae are quite comprehensible. Furthermore, the employed rule-based computation contains an indeterminism in that the exact order of rule evaluation is not specified; PDL allows easy formulation of and reasoning about indeterministic programs. Communication between resources is not the key issue here, so the formalization language need not reflect this aspect. For the specification of the correlation rules we only need constructs from PDL, whereas formalization of the termination property of the Automation Manager requires an extension of ordinary propositional dynamic logic. We employ $\Delta$PDL, which adds a divergence operator $\Delta$ to PDL to enable the notion of infinite computation. $\Delta$PDL was introduced by Streett [Str82], a similar extension can be found in the work of Harel and Sherman [HS82].

PDL allows reasoning about programs (denoted by $\alpha, \beta, \ldots$) and their properties, and thus contains language constructs for programs as well as for propositional formulae. Atomic propositions (P,Q,R, . . . ) can be combined to compound PDL formulae (F,G, . . . ) using the Boolean connectives ¬, V and ∧, composite programs are composed out of atomic programs using three different connectives: $\alpha;\beta$ denotes program sequencing, $\alpha \cup \beta$ nondeterministic choice, and $\alpha^*$ a finite, nondeterministic number of repetitions of program $\alpha$. For a formula F the program F? denotes the test for property F, i.e. F? proceeds if F is true, and otherwise fails. The modal formulae $[\alpha]$F and $<\alpha>$F have the informal meaning "all terminating executions of program $\alpha$ lead to a situation in which F holds" respectively "there is a (terminating) program run of $\alpha$ after which F is true ". $\Delta$PDL adds the construct $\Delta \alpha$ to the language expressing that the program $\alpha^*$ can diverge, i.e. enter a non-halting computation. We refer the reader to Harel's introductory chapter on PDL [Har84] for a thorough elaboration.

Encoding of the Correlation Rules and the Status Computation

Encoding of correlation rules and formalization of the Automation Manager program is accomplished in four steps: First, we encode the variable's finite domains in Boolean logic; then we translate the rule's actions and their semantics to PDL; afterwards we are able to give PDL encodings of complete correlation rules; and finally we give a formal description of program executions of the rule-based Automation Manager.

Finite Domains

Each variable v occurring in a correlation rule can take a value of a finite domain $D_v$ depending on the variable. For our PDL encoding, we first need to decompose the finite domains into Boolean propositions. We therefore introduce new propositional variables $P_{v,d}$ for each possible value $d \in D_v$ of each variable $v$, expressing the fact that variable $v$ takes value $d$. We then need additional restrictions, expressing that each finite domain variable takes exactly one of its possible values. Supposing a set $V$ of correlation rule variables, we thus get an additional propositional restriction $R_V$:

$$\bigwedge_{v \in V} \left( \bigvee_{d \in D_v} P_{v,d} \wedge \bigwedge_{\substack{d_1, d_2 \in D_v \\ d_1 \neq d_2}} \neg (P_{v,d_1} \wedge P_{v,d_2}) \right)$$

Formulae similar to $R_V$ also occur in the context of propositional encoding of planning problems, where they are referred to as linear encodings [KMS96].

Atomic Programs

The atomic programs of our formalization are assignment programs, denoted by $\alpha_{v,d}$, where $\alpha_{v,d}$ assigns value $d \in D_v$ to variable $v \in V_S$. Each assignment program is, of course, deterministic and after its execution the variable has the indicated value. Other computed variables are not affected. Therefore the following PDL properties hold for each program $\alpha_{v,d}$ and all propositions p:

1. $[\alpha_{v,d}]p \Leftrightarrow \langle\alpha_{v,d}\rangle p$
2. $[\alpha_{v,d}]P_{v,d}$
3. $P_{w,d'} \Rightarrow [\alpha_{v,d}]P_{w,d'}$ for all $w \in V_S$, $w \neq v$ and $d' \in D_w$.

We will denote the conjunction of these propositions for all atomic programs by $R_\alpha$.

Correlation Rules

In the following we assume for each variable-value pair (v,d) at most one rule with an action setting variable $v$ to $d$ in its then-part. If this is not the case, the when-parts of rules with common actions can be merged disjunctively. To encode a correlation rule, its when-part is recursively translated into a Boolean logic formula using transformation $\tau$, which is defined for the base case by $\tau(v E \{d_0, \ldots, d_j\}) = P_{v,d_0} \vee \ldots \vee P_{v,d_j}$
$\tau(v \text{NOT } E \{d_0, \ldots, d_j\}) = \neg P_{v,d_0} \wedge \ldots \wedge \neg P_{v,d_j}$ and extended to complex formulae in the obvious way. For the then-part we only have to consider actions setting variables, which are translated by $\tau$ to their corresponding atomic PDL programs:

$\tau(\text{SetVariable } v=d) = \alpha_{v,d}$.

Given a rule's translated when-part $F_{v,d}$ and its translated then-part $\alpha_{v,d}$, we get as PDL program $R_{v,d}$ for that rule:

$R_{v,d} := (F_{v,d} \wedge \neg P_{v,d})?; \alpha_{v,d}$, expressing that the action of the then-part is executed, provided the when-part holds and the variable is not already set to the intended value. The additional restriction $\neg P_{v,d}$ prevents rule executions that do not produce any change of variable values.

Automation Manager

We are now able to formally specify the computations performed by the Automation Manager program. As there is no rule evaluation order, the program just selects any rule, evaluates its formula, executes the action part and starts over again. The single-step Automation Manager program S and the Automation Manager program AM therefore look like this:

$$S = \bigcup_{v \in V_S, d \in D_U} R_{v,d}$$

$$AM = S^*; \left( \bigwedge_{v \in V_S, d \in D_U} (F_{v,d} \Rightarrow P_{v,d}) \right)?$$

For each SA resource a program of the above kind is generated. Each Automation Manager program runs until no further rules can be applied (reflected by the last test in the Automation Manager program AM), and is restarted as soon as an observed external variable $v_o \in V_O$ changes its value.

Consistency Properties of the Correlation Rule System

The computation relation generated by the correlation rules should be functional and terminating. For example, a status computation should not result in different values depending on the exact order of rule application, and it should produce a result in a finite number of computation steps. Moreover, we are faced with the situation that there are external variables (observation variables) that may change their values during computation. Thus, to produce sensible statuses, short computations are needed, and observed external variables should not change frequently. For our consistency properties we therefore assume all external observed variables to be fixed.

We now turn to the formalization of the two consistency criteria termination and functionality. As above, we denote by AM, respectively S, the part of the Automation Manager program that deals with full, respectively single step, computations. In the following, formula PRE encodes common preconditions for all consistency criteria. This includes the finite domain restrictions $R_V$, the atomic program specifications $R_\alpha$, and the fixing of all observation variables during computation. We therefore define $$PRE := R_V \wedge R_\alpha \wedge \bigwedge_{\substack{v \in V_O, w \in V_S \\ d \in D_v, d' \in D_w}} (P_{v,d} \Rightarrow [\alpha_{w,d'}]P_{v,d}).$$

The following $\Delta$PDL formula, provided it is valid, guarantees that there is no divergent computation:[1]

[1] Note that this property cannot be expressed in ordinary PDL [Str82].

$$PRE \Rightarrow \neg \Delta S. \tag{1}$$

To ensure functionality for a computation starting in some state, we need a final result that is unique. So, if there is a terminating computation sequence of the Automation Manager all other computations have to end in the same state:

$$PRE \Rightarrow (\langle AM \rangle p \Leftrightarrow [AM]p) \tag{2}$$

There are other consistency criteria (for example confluence) that could be checked, too. We will not elaborate on this, but instead concentrate on the termination property in the following.

As termination is defined as the absence of an infinite sequence of consecutive computation states ($\neg \Delta \alpha$), we have to fix more precisely the notion of a state. A state s is an assignment to the propositional variables, i.e. a function $V \rightarrow \{0,1\}$. A state s is said to be proper if it correctly reflects the finite domain restriction $R_V$, i.e. if s is a model of $R_V$, or, equivalently in symbols, $s|=R_V$. A pair of states $(s_0, s_1)$ is called an $\alpha_{v,d}$-transition $$\left(\text{denoted by } s_0 \xrightarrow{v=d} s_1\right)$$

if execution of program $\alpha_{v,d}$ leads from $s_0$ to $s_1$, i.e. $s_0$ and $s_1$ are proper states, with $s_0$ and $s_1$ differing only on the set $\{P_{v,d'}|d' \in D_v\}$, and $s_1(P_{v,d})=1$.

As the number of states is finite, all non-terminating computations are caused by loops in the program transition graph. For example, the 2-loop $$s_0 \xrightarrow{v=d_1} s_1 \xrightarrow{v=d_0} s_0 \tag{3}$$

generates an infinite computation oscillating between the states $s_0$ and $s_1$. As another example consider the 4-loop $$s_{00} \xrightarrow{v_0=d_1^0} s_{01} \xrightarrow{v_1=d_1^1} s_{11} \xrightarrow{v_0=d_0^0} s_{10} \xrightarrow{v_1=d_0^1} s_{00}$$

that is not decomposable into two simpler 2-loops. Showing termination of the Automation Manager program can thus be accomplished by proving the absence of n-loops for all $n \geq 2$. Note, that the case n=2 in particular covers those situations where the loops are due to an overlap of the when-parts of two rules for the same variable, i.e. when $s_0, s_1|=F_{v,d_0} \wedge F_{v,d_1}$. It is thus of special importance.

To prove the non-existence of loops—as well as the other consistency criteria—directly within the $\Delta$PDL formalism, we can in principle distinguish two main approaches: either by model checking or by theorem proving. For the first approach, a Kripke structure has to be created based on the elementary properties $R_\alpha$ of the atomic assignment programs and on the validity of the propositions $P_{v,d}$, considering the restrictions $R_V$. This step builds a structure that fulfills the general precondition PRE. Then it is checked, whether or not the $\Delta$PDL consistency criteria (without preconditions) are fulfilled in the generated model. In the theorem proving formalism, we try to derive the consistency criteria directly from the preconditions.

We have chosen yet another way, which translates the PDL proof obligations into purely propositional logic formulae. We thus enable the application of advanced propositional SAT-checkers.

Conversion to Propositional Satisfiability

Conversion to a purely propositional formalism requires handling of different states within one formula. We use restrictions to achieve this goal.

The proper restriction $F|_{v=d}$ of a propositional formula F is defined as the homomorphic extension of the function $$P_{v',d'}|_{v=d} = \begin{cases} \top & \text{if } v=v', d=d', \\ \bot & \text{if } v=v', d \neq d', \\ P_{v',d'} & \text{if } v \neq v'. \end{cases}$$

The following lemma is easily shown and allows the formulation of propositional properties concerning multiple computation states.

Lemma 0.1 Let $s_0 \xrightarrow{v=d} s_1$. Then $s_1 | = F$ iff $s_0 | = F|_{v=d}$.

At first, we want to consider 2-loops. All 2-loops are of the form $$s_0 \xrightarrow{v=d_1} s_1 \xrightarrow{v=d_0} s_0.$$

Thus, the absence of 2-loops is expressed in accordance with (1) by $$PRE \Rightarrow \neg \exists s_0, s_1, v, d_0, d_1 \left(s_0 \xrightarrow{v=d_1} s_1 \xrightarrow{v=d_0} s_0\right). \tag{4}$$

The two $\alpha_{v,d_{0/1}}$-transitions can be performed provided the following holds (by definition of $\alpha$-transitions and the Automation Manager program):

$$s_0, s_1|=R_V s_1|=P_{v,d_1} s_0|=P_{v,d_0}$$
$$s_0|=F_{v,d_1} \wedge \neg P_{v,d_1} s_1|=F_{v,d_0} \wedge \neg P_{v,d_0}$$

According to Lemma 0.1 this is equivalent to $$s_0|=R_V \wedge P_{v,d_0} \wedge F_{v,d_1} \wedge \neg P_{v,d_1} \wedge (R_V \wedge F_{v,d_0})|_{v=d_1},$$

which can be further simplified to $$s_0|=R_V \wedge P_{v,d_0} \wedge F_{v,d_1} \wedge F_{v,d_0}|_{v=d_1}.$$

As a propositional formula for the absence of 2-loops we therefore get from (4) by dropping the now superfluous semantics of atomic programs from PRE and after further simplification:

$$R_V \Rightarrow \neg (P_{v,d_0} \wedge F_{v,d_1} \wedge F_{v,d_0}|_{v=d_1}), \tag{5}$$

which has to be valid for all $v$, $d_0$, and $d_1$. Similarly, the absence of 3-loops is reflected by the validity of $$R_V \Rightarrow \neg (P_{v,d_0} \wedge F_{v,d_1} \wedge F_{v,d_2}|_{v=d_1} \wedge F_{v,d_0}|_{v=d_2})$$

for all $v$, $d_0$, $d_1$, and $d_2$. The extension to n-loops involving only one variable $v$ is obvious. The general case of n-loops is more complicated, however, due to different types of loops involving the modification of multiple finite domain variables. This general case is not considered here.

Not all loops detected by this method really do occur. For example, in the formula above, $s_0$ has to be a reachable state of the computation. Moreover, rule evaluation in the Automation Manager program is subject to a fairness condition, stating that a rule is eventually executed provided its when-part is satisfied.[2] We modeled the fairness condition by considering only starting states $s_0$ in which all non-affected variables are already computed. I.e. we demand for a loop involving variable $v$ that all rules containing other variables $w \neq v$ in their action part cannot be executed.

[2]The actual condition in the Automation Manager is even stronger in that rules are cyclically checked for execution.

For our experiments we therefore checked the extended formula E instead of Formula (5) where E is defined as $$R_V \wedge \bigwedge_{\substack{w \in V_S, w \neq v \\ d_w \in D_w}} (F_{w,d_w} \Rightarrow P_{w,d_w}) \Rightarrow \neg (P_{v,d_0} \wedge F_{v,d_1} \wedge F_{v,d_0}|_{v=d_1}). \tag{6}$$

Verification Techniques

We will now describe the techniques we used to prove the propositional formulae of the last section. We also show how the counter-models that appear in case a proposition could not be proved can be made more intelligible.

Davis-Putnam-Style Prover

We used a Davis-Putnam-style prover to show the unsatisfiability of the negations of the aforementioned formulae.

The prover is our own implementation (see [Kai01] for a more detailed description) which, in contrast to other DP implementations, does not require the input to be in conjunctive normal form. Moreover, it allows the direct specification of n-out-of-m-constructs that frequently occur in practical applications, in our case in the translation of the finite domain restriction $R_V$ to Boolean logic. So instead of formula $R_V$ which is quadratic in the domain sizes $D_v$, we just have to deal with a linear-size formula in our extended language.

BDD-Based Approach

We also experimented with a conversion of the formulae to binary decision diagrams (BDDs), where we used Somenzi's CUDD package [Som98]. One reason to use BDDs was to get a manageable representation of all counter-models in case the propositions did not hold.

To further simplify the counter-model representation we applied an existential abstraction over variables not occurring in the currently investigated rules, i.e. we retained only variables occurring in $F_{v,d_0}$ or $F_{v,d_1}$ of Formula (6) in the counter-models and removed all others. More formally, we generated a quantified Boolean formula $\exists \vec{X} F$ where F is Formula (6) and $\vec{X}$ contains exactly those variables not appearing in $F_{v,d_0}$ and $F_{v,d_1}$, i.e. $\vec{X} = V \setminus (Var(F_{v,d_0}) \cup Var(F_{v,d_1}))$.

Implicit Assumptions on Observation Variables

Not all combinations of possible values for observation variables do really occur. But which of them are possible and which are not is not laid down in the Automation Manager's expert system. For our verification task we thus added some further restrictions to the set $R_V$ reflecting cases that do not occur in practice. Such cases can be specified by SA experts after an investigation of the counter-models.

Experimental Results and Experiences

We conducted experiments with a subset of the rules of the Automation Manager and exemplarily investigated the 41 rules for the compound status computation. The compound status indicates the overall status of a resource, depending on its automation goal, the actual state and on other resources' states. It can take any of seven different values, so we had to perform 21 proofs of Formula (6) to show the absence of 2-loops. Instead of proving these formulae directly, we tested their negations for unsatisfiability.

We used our DP-style prover implementation to check the generated formulae. As our implementation allows special select-n-out-of-m-constructs [Kai01], formula sizes could be kept small. Proofs or counter-models for all formulae were found in under a second. Initially, seven of the 21 instances were satisfiable, each indicating a possible non-terminating computation. However, further examination showed that most of these cases cannot occur in practice. The reason for these false error readings lies in an incomplete formalization in the rule system. E. g., implicit assumptions on which states are reachable have to be made explicit in order to achieve practically usable results. Thus, we added the abovementioned further restrictions on observation variables, which brought down the number of inconsistencies to three. For these three cases we generated BDDs of the 2-loop-formulae. The times to build up the BDDs again were under a second. Whereas SAT-checkers can only deliver counter-models of the termination property, BDDs allow a direct representation of the condition under which the loop occurs and thus enable further processing of the result. We made use of the BDD representation by applying existential abstraction to variables not occurring in the rules' when-parts. This helped greatly to find out in which situations a loop occurs and thus facilitated correction of the rules.

All of our detected 2-loops were reproduced by emulation on a zSeries test system and resulted in a modification of the final product. The final version thus contained no 2-loop-errors. So, by identifying real defects, we could further increase the reliability of the Automation Manager.

Conclusion

By formalizing the SA Automation Manager's rule-based expert system we could prove a restricted non-looping property for a part of the rule system. After encoding the rules and consistency properties in ΔPDL and converting them to SAT, our approach led us to a set of propositional properties that current SAT-checking techniques can easily handle. We also consider it an important observation that in practice rule systems may be incompletely specified and that formalization requires to make implicit assumptions explicit in order to avoid meaningless results.

What is claimed is:

1. A method for verifying a set of rules in a rule-based expert system, the method comprising the steps of:

retrieving a set of rules from an expert system;

providing one or more logical expressions specifying cases of faulty behavior of said expert system; and executing an automatic theorem prover in order to verify of whether or not the retrieved set of rules fulfill the provided one or more logical expressions, if yes, generating a message indicating the existence of a case of faulty behavior, if no, generating a message indicating the correctness of said set of rules.

2. The method according to claim 1, wherein the step of retrieving the set of rules includes the step of:

converting the set of rules from the expert system's format into logical expressions.

3. The method according to claim 2, wherein the step of converting the set of rules from the expert system's format into logical expressions includes the step of:

transforming multi-valued logic variables into two-valued logic variables.

4. The method according to claim 2 or 3, wherein the set of rules is basically formed by a series of IF-THEN-statements and the step of converting the set of rules from the expert system's format into logical expressions includes the step of:

transforming the action part of the IF-THEN-statement into a logical expression.

5. The method according to claim 1, wherein the step of providing one or more logical expressions specifying cases of faulty behavior of said expert system include the step of:

deriving said one or more logical expressions specifying cases of faulty behavior from one or more abstract definitions of erroneous scenarios.

6. The method according to claim 5, wherein the step of deriving said one or more logical expressions specifying cases of faulty behavior from one or more abstract definitions of erroneous scenarios includes the step of:

providing logical expressions specifying rule-overlaps.

7. The method according to claim 5 or 6, wherein the step of deriving said one or more logical expressions specifying cases of faulty behavior from one or more abstract definitions of erroneous scenarios includes the step of:

providing logical expressions specifying inconsistently interacting rules.

8. The method according to one of the claim 5 or 6, wherein the step of deriving said one or more logical expressions specifying cases of faulty behavior from one or more abstract definitions of erroneous scenarios includes the step of:

taking into account the set of rules retrieved from the expert system.

9. The method according to claim 1, wherein the set of rules is basically formed by a series of IF-THEN-statements and the step of providing one or more logical expressions specifying cases of faulty behavior of said expert system include the step of:

providing a logical expression specifying overlapping IF-statements of rules with the same variable in the THEN-statement.

10. The method according to claim 1, wherein the set of rules is basically formed by a series of IF-THEN-statements and the step of providing one or more logical expressions specifying cases of faulty behavior of said expert system include the step of:

providing a logical expression specifying inconsistently interacting rules in the sense that the THEN-statement of one rule activates the IF-statement of another rule and vice versa.

11. The method according to claim 1, wherein the step of generating a message indicating the existence of a case of faulty behavior includes the step of:

simplifying the result provided by said automatic theorem prover.

12. The method according to claim 11, wherein the step of simplifying the result provided by said automatic theorem prover includes the step of:

removing irrelevant variables.

13. A device for verifying a set of rules in a rule-based expert system, the device comprising:

means for retrieving a set of rules from an expert system means for providing one or more logical expressions specifying cases of faulty behavior of said expert system;

an automatic theorem prover for verifying of whether or not the retrieved set of rules fulfill the provided one or more logical expressions; and means for generating a message, whereby said means for generating a message is configured to generate a message indicating the existence of a case of faulty behavior and a message indicating the correctness of said set of rules depending on a result generated by said automatic theorem prover.

14. The device according to claim 13, further comprising means for converting the set of rules from the expert system's format into logical expressions.

15. The device according to one of the claim 13, further comprising means for deriving said one or more logical expressions specifying cases of faulty behavior from one or more abstract definitions of erroneous scenarios.

16. The device according to one of the claim 13, further comprising means for simplifying the result provided by said automatic theorem prover.

17. A computer program product stored on a computer usable medium, comprising computer readable program means for causing a computer to perform a method comprising the steps of:

retrieving a set of rules from an expert system;

providing one or more logical expressions specifying cases of faulty behavior of said expert system; and executing an automatic theorem prover in order to verify of whether or not the retrieved set of rules fulfill the provided one or more logical expressions, if yes, generating a message indicating the existence of a case of faulty behavior, if no, generating a message indicating the correctness of said set of rules.

* * * * *